April 7, 1953

N. G. LINDSTRÖM 2,633,747

DEVICE FOR MEASURING SPEEDS AND HEAT
QUANTITIES IN RUNNING MEDIA

Filed Feb. 5, 1947

Inventor
N. G. Lindström

April 7, 1953

N. G. LINDSTRÖM 2,633,747

DEVICE FOR MEASURING SPEEDS AND HEAT
QUANTITIES IN RUNNING MEDIA

Filed Feb. 5, 1947

Inventor
N. G. Lindström
By Glasert Downing Seebold
Attys

Inventor
N. G. Lindström

Fig. 9

Patented Apr. 7, 1953

2,633,747

UNITED STATES PATENT OFFICE 2,633,747

DEVICE FOR MEASURING SPEEDS AND HEAT QUANTITIES IN RUNNING MEDIA

Nils Gottfrid Lindström, Stockholm, Sweden, assignor to Telefonaktiebolaget L M Ericsson, Stockholm, Sweden, a company of Sweden Application February 5, 1947, Serial No. 726,606
In Sweden February 18, 1946

10 Claims. (Cl. 73—193)

The present invention relates to an apparatus for measuring heat quantities transported by a running medium or more exactly for measuring the product of the rate of flow of a running medium and the difference of temperature between said medium and a heat accumulating device of any kind. The invention is based on the physical law that the heat transition constant between a running medium and a heat conducting body varies with the velocity of the medium. If the said difference of temperature is constant, the velocity of the medium will be proportional to the heat quantity carried by the medium per unit of time and to the reading of the measuring device.

According to the invention, a device for measuring the difference of velocity between a running or gaseous medium and a wall limiting the medium is obtained by the medium being brought to heat or cool a part of a heat conducting body placed on the same side of the wall as the medium and heat insulated from said wall, another part of the same said body on the other side of the wall being in heat conducting contact with a heat diverting or heat emitting device having a temperature differing from the temperature of the medium, and by a measuring device provided for measuring the difference of temperature arising by means of the device between two different parts of the heat conducting body.

Figure 6:
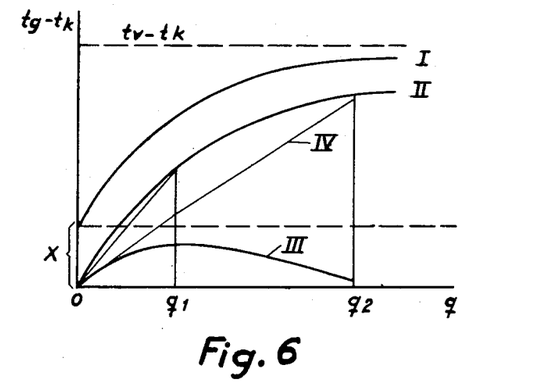

If the temperature of the medium, as well as the temperature of the heat emitting device, is constant, a relation is obtained between the velocity of the medium and the difference of temperature $(tg-tk)$ between two different parts of the heat conducting body, which relation is illustrated by the curve I in Fig. 6. An electromotive force proportional to the difference of temperature $(tg-tk)$ can be obtained by means of thermoelements, and said electro-motive force can be impressed upon a galvanometer, the scale of which is arranged to match with the curve I in Fig. 6 so that the velocity $q$ of the medium can be read directly. At high velocities, the curve asymptotically approaches a limit value for $(tg-tk)$, the measuring accuracy thereby decreasing. The measuring device thus has a limited measuring range, the size of which can vary, for example, by letting parts with different sizes of the heat conducting body come into contact with the running medium. If the difference of temperature between the running medium and the heat diverting or heat emitting device is not constant enough to make a satisfactory measuring result possible, the variations in difference of temperature can be compensated by changing the relation between the reading of the measuring device and the difference of temperature between two different parts of the heat conducting body in dependence upon the difference of temperature between the medium and said device.

The curve I in Fig. 6 is not a linear function and therefore a measuring device, the reading of which follows this curve, is not suitable for integrating measurements. Furthermore, the curve does not pass through the origin of coordinates and therefore a constant deduction must always be made. Said faults can, however, be compensated by special arrangements. When the medium is stationary, the difference of temperature $(tg-tk)=X$ is proportional to the difference of temperature $(tv-tk)$ between the medium and the heat diverting or heat emitting device. By measuring $(tg-tk)$ by means of thermoelements and selecting a part, corresponding to the value $X$, of the electro-motive force indicating $(tv-tk)$ and by connecting the two thermoelements so that they counteract each other, it is possible to obtain an electro-motive force corresponding to $(tg-tk-X)$. Thus a relation corresponding to curve II in Fig. 6 is obtained between the reading of the measuring device and the velocity of the medium.

When measuring the heat quantity, integrating measures or measures of the average value of the heat quantity consumption during a certain time are necessary. By similar measurements it is desirable that a linear relation exist between the reading of the measuring device and the heat quantity consumed per unit of time. This is achieved by introducing heat conducting bodies at two places in the medium, where the velocity of the medium is different, or the bodies being different from each other; thermoelements then being introduced at at least one point in each of said bodies, the points being chosen, so that the electro-motive force, curve III in Fig. 6, resulting from said thermoelements, will give a linear relation between the reading of the measuring device and the velocity of the medium, when subtracted from the electro-motive force represented by curve I in Fig. 6. It will appear from the description of the embodiments of the invention shown in Figs. 8 and 9, how this is made possible. The invention will be described more closely with reference to the accompanying drawings Figs. 1-9.

Figure 1:
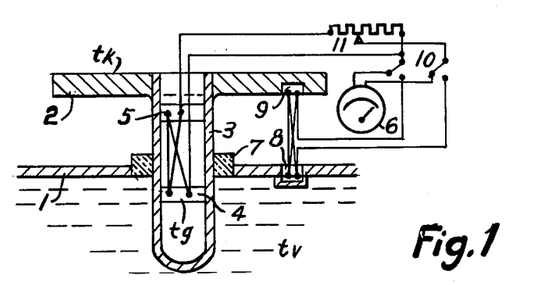

Fig. 1 shows the main device for measuring the velocity of a medium. A medium with a certain temperature $tv$ is limited by a wall $l$, in which there is a bushing $7$ of heat insulating material. In said bushing, there is a heat conducting body 3, arranged so that one part of it is inside the medium and another part is in heat conducting relation with a heat diverting or heat emitting body 2, which has a temperature $tk$ differing from the temperature of the medium. The body 2 may be a cooling device, a heat plant or a plate with room temperature. In the latter case, however, the heat diverting or heat emitting capacity must be so great, that a sufficient difference of temperature $tv-tk$ is maintained. In the heat conducting body 3 there are thermoelements at the points 4 and 5. The temperature at point 5 may correspond to the temperature $tk$ of the body 2. The heat diverting or heat emitting body 2 acts as comparative object or reference device. The temperature $tg$ at point 4 will be a function of the velocity of the medium. If the medium is stationary a relatively small difference of temperature $(tg-tk)$ is obtained between the points 4 and 5, it being here assumed that the temperature at point 5 is $tk$. If the velocity of the medium is very great, the temperature $tg$ will approach the temperature $tv$ of the medium. At points 4 and 5 in Fig. 1 there is a thermoelement, the functions of which are connected in series so, that every second point in the series will lie at point 4 and every second at point 5. The difference of electro-motive force between the first and the last thermoelement in the series is measured by a galvanometer 6, the reading of which indicates the velocity $q$ of the medium. The device according to the description presupposes also that the difference of temperature $tv-tk$ is kept constant, for example, by regulating the temperature $tk$ either automatically or by hand, or by keeping $tk$ at such a high value, that the variations of $tv$ can be neglected.

The measurement can however also be made by compensating the difference of temperature $tv-tk$. For this purpose, there is a double pole switch 10 in Fig. 1, by means of which the galvanometer can be connected either to the thermoelement 4—5, as described above, or to a thermoelement 8—9, which gives an electro-motive force proportional to the difference of temperature $tv-tk$. The thermoelement 8—9 consists of two groups of junctions 8 and 9, one of which assumes the temperature of the medium, and the other the temperature of the reference device 2. To begin with, the electro-motive force of the thermoelement 8—9 is being measured. Then a voltage divider 11 is set according to the obtained reading of galvanometer 6. After this, the galvanometer is connected to the voltage divider 11, the reading of which will then indicate the velocity of the medium. The difference of temperature $tg-tk$ will, it is therefore seen, vary proportionally with $tv-tk$ for each different value of the velocity of the medium.

Figure 2:
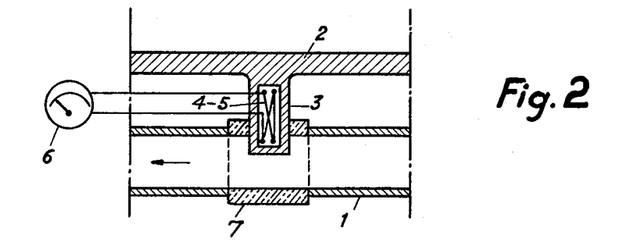

Fig. 2 shows an application of the invention to measurement of heat quantities in the case in which the heat transporting medium has constant temperature and there is a reference device with equally constant temperature. Such conditions can exist, for instance, in a hot water plant, the hot water thereby being kept at a practically constant temperature and used in a room, the room temperature of which only varies within narrow limits. In Fig. 2, 1 designates an inlet pipe through which the heat transporting medium is conducted. A bushing 7 within said pipe is made of heat insulating material. Through this bushing within the walls of said pipe a heat conducting body 3 is inserted. The body 3 is in heat conducting relation with a wall or plate 2, at the ambient temperature of the surroundings and having a great heat diverting capacity. A thermoelement 4—5 is arranged in the heat conducting body 3. If a galvanometer 6 is connected to said thermoelement, its reading can be used to indicate the quantity of heat consumed per unit of time at the particular instant.

Figures 3, 4, 5:
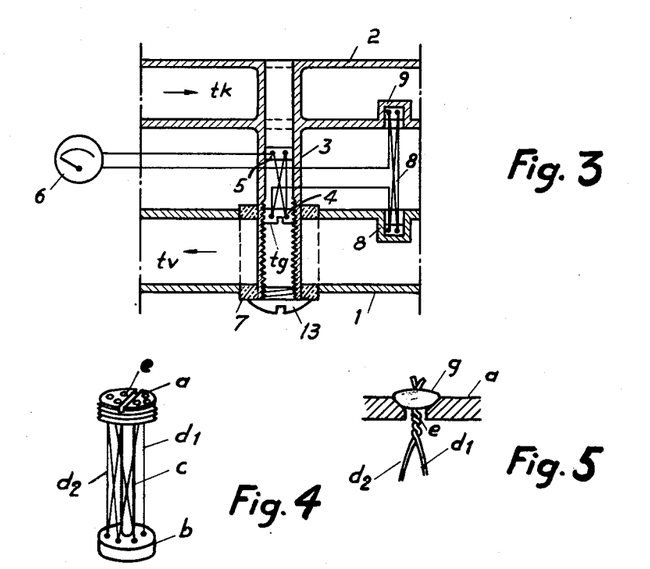

Fig. 3 shows another embodiment of the invention. Two conduits 1 and 2 are shown, being the inlet and outlet pipes, respectively, of a heat consuming device. A heat conducting body 3, shaped as a tube, passes right through both conduits and is welded to the walls of the outlet pipe. The inlet pipe 1 is made of heat insulating material 7 at the place, where the tube passes through the pipe. The tube 3 is inwardly threaded and contains a thermoelement 4—5 made according to Fig. 4. Said thermoelement consists of two washers $a$ and $b$ of electrically insulating material, for instance, artificial resin. The washers $a$ and $b$ are fastened each at one end of a bar $c$ and provided with holes $e$. Between said holes, wires $d1$ and $d2$, made of different metallic materials, have been stretched, twisted, and provided with a lump of solder $g$ at the ends so that they are held in the holes $e$, as shown in Fig. 5. One of the washers, $a$, is threaded so that it can be screwed into the tube 3. The other washer, $b$, turns freely in tube 3, but is closely fitted within the walls of said tube in order to obtain a good heat transmission between the tube and the washer. The tube 3 is closed at the end which terminates in the inlet pipe by a screw 13 of heat insulating material, for instance, wood. In order that the galvanometer 6 shall show zero when the medium in the pipe is stationary, there is provided a thermoelement 8—9, the junctions of which are in heat conducting relationship to the inlet and outlet pipes, which condition is provided for by placing them, respectively, in the walls of the pipes at the points 8 and 9. The thermoelements 8 and 9 are so connected in the circuit that their electro-motive force counteracts the electro-motive force of the thermoelements 4—5.

The galvanometer 6 indicates the product of the velocity of the medium and the difference of temperature $tv-tk$. If the area of the pipe 1 is taken into account in the constant of the galvanometer, the heat consumption in the heat consuming device is measured as described below.

The relation between the velocity of the medium in the inlet pipe 1 and the reading of the galvanometer is indicated by curve I in Fig. 6. The temperature of the medium in the inlet pipe is indicated by $tv$ and in the outlet pipe by $tk$. The thermoelement 4—5 is responsive to the heat conducted through the tube 3 by part of the difference of temperature $tv-tk$. Said part is indicated by $tg-tk$, supposing that the unthreaded plate $b$ of the thermoelement 4—5 assumes the temperature $tk$. If the medium is stationary, the electro-motive forces from thermoelements 4—5 and 8—9 will nullify each other. Each element is therefore supposed to produce a certain voltage X according to Fig. 6. When the medium starts to move, the electro-motive force from the thermoelement 8—9 does not change if the temperatures $tv$ and $tk$ remain constant, while the temperature $tg$ increases. The value $$tg-tk-X$$

follows the curve II in Fig. 6. If the temperatures $tv$ and $tk$ are also altered, this will affect both thermoelements 4—5 and 8—9. The difference of temperature X will therefore be proportional to $tv-tk$, and therefore $tg-tk-X$ as well as $tg-tk$ will, for each separate value of $q$, be proportional to the difference of temperature $tv-tk$. At low velocities of the medium, that is, between 0 and the value $q_1$ liters per minute within which interval the curve II in Fig. 6 can be considered as being approximately linear, the temperature $tg-tk-X$ can be assumed to be proportional to the velocity of the medium, as long as the difference of temperature $tv-tk$ remains constant. If the galvanometer 6 is graduated so that it indicates the velocity of the medium accurately for a certain value of $tv-tk=T$, the following equation is valid for the other values of the difference of temperature $tv-tk$ within the interval $$q=0 \text{ to } q=q_1$$

$$q=K\cdot(tg-tk-X)\cdot\frac{T}{tv-tk}$$

As regards the heat consumption Q, it is found to be true that $$Q=q\cdot(tv-tk)$$

And therefore, $$Q=T\cdot K\cdot(tg-tk-X)$$

K is here the constant of the galvanometer in measurement of the velocity of the medium, and $T\cdot K$ is the constant of the galvanometer in measment of the heat consumption. The heat consumption will thus, within the interval $$q=0 \text{ to } q=q_1,$$

be proportional to the reading of the galvanometer or to the electrical current provided by the thermoelements 4—5 and 8—9. This makes integrating measurements possible. This can be done by reading the galvanometer periodically, but the preferred instrument for such measurements is an electrolytic meter. Due to the thermoelement 4—5 being threaded in the tube 3, the element can be exactly fitted in its place so that the reading of the galvanometer will be correct.

Figure 8:
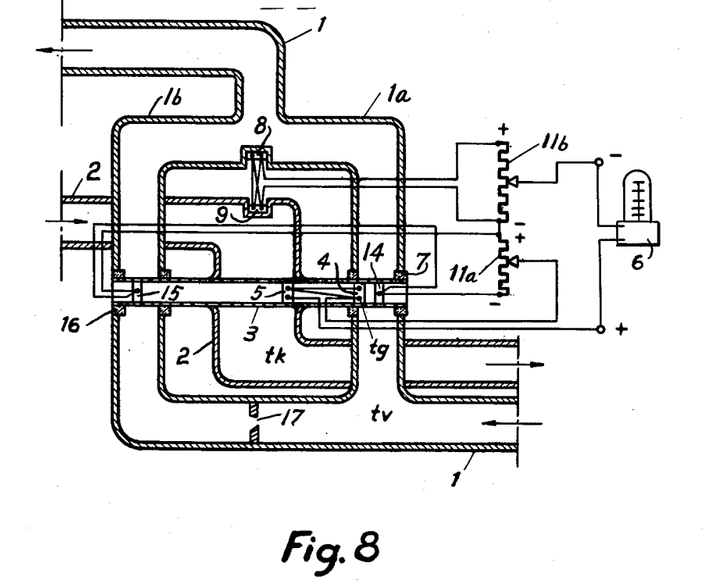
Figure 9:
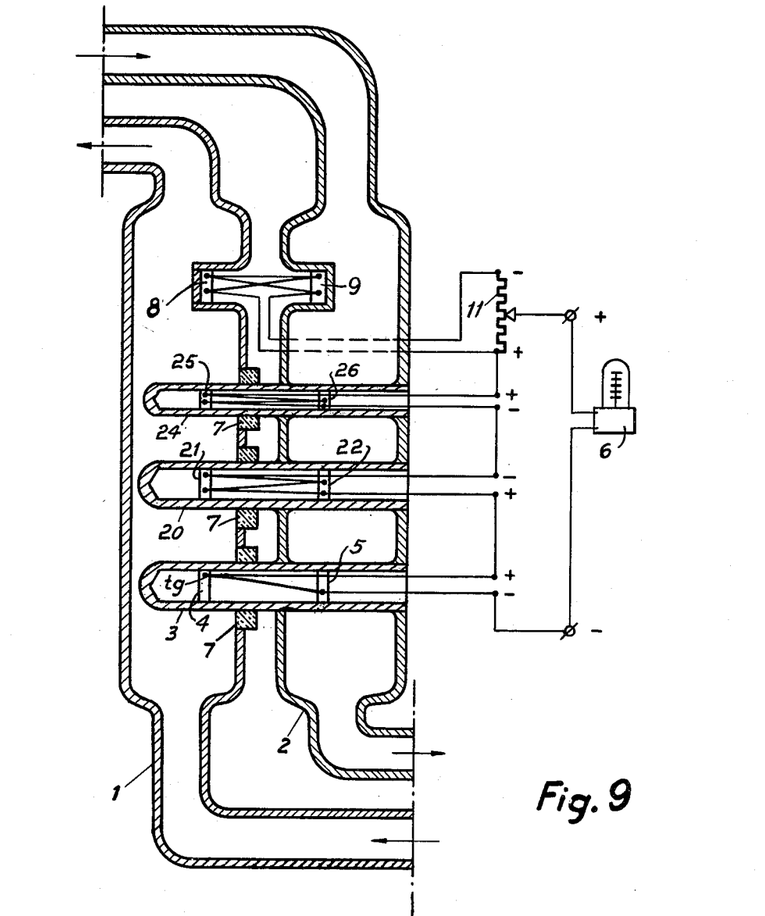

For practical use, a heat quantity meter according to Fig. 3 can thus not always be considered as satisfactory owing to the deviation in measuring accuracy caused by the curves I and II on Fig. 6 not being straight lines. In Figs. 8 and 9, however, two different methods of obtaining thermoelectrical currents are shown, wherein said currents are proportional to the heat consumption in a device, the inlet and outlet pipes of which are accessible for measuring.

In Fig. 8 the inlet pipe 1 has two forked branches 1a and 1b. In the branch 1b there is a constriction 17 by means of which the velocity of the heat transporting medium in the branch 1b is reduced in comparison with its speed in the branch 1a. A heat conducting body 3, shaped as a tube, is threaded directly through the branches 1a and 1b, as well as through the outlet pipe 2. The tube 3 is heat insulated from the branches 1a and 1b by means of bushings 7, but is welded to the outlet pipe 2. A thermoelement 4—5 is introduced in the tube 3 as described above in connection with Fig. 3, and another thermoelement 8—9 compensates for the difference of temperature X at zero velocity of the medium. The thermoelements 4—5 and 8—9 thus develop in combination a thermoelectric current, which is proportional to $tg-tk-X$, where $tg$ is dependent upon the temperature of the medium and its velocity in the inlet pipe, $tk$ is the temperature of the medium in the outlet pipe, and X is the temperature differential between the two groups of junctions of the thermoelement 4—5, when the medium is stationary. The curve II in Fig. 6 shows the relationship between the velocity of the medium and the difference of temperature $tg-tk-X$. In order to be able accurately to balance the difference of temperature X by means of the thermoelement there is provided a voltage divider 11b, by means of which the decrease of electro-motive force from the thermoelement 8—9 is set.

There is furthermore another thermoelement 14—15 screwed in the tube 3. One set 14 of the junctions of this thermoelement is placed in that part of the tube which is surrounded by the medium in the branch 1a, and the other set of junctions 15 in that part of the tube which is surrounded by the medium in the branch 1b. When the velocity of the medium is 0 these sets of junctions of the thermoelements will assume the same temperature, and due to that fact no electrical current will be produced by them. When the medium is moving, the junctions at 14 have a higher temperature than the junctions at 15, since the velocity of the medium is greater in the branch 1a than in the branch 1b. With high velocity of the medium, the difference of temperature will again decrease and at very high velocity the temperatures will be equalized. The difference of temperature between the junctions 14 and 15 will follow the curve III in Fig. 6 with variation of $q$. By means of small displacements of the junctions 14 and 15, and by means of a voltage divider 11a, the curve III can be given such a shape, that the difference between the curves II and III will very nearly be a straight line through the origin of coordinates, within an interval $q=0$ to $q=q_2$. Since the temperatures for the junctions 14 and 15 are determined by the temperature gradient along the tube 3, their electro-motive force will be proportional to the difference of temperature $tv-tk$ for every single value of $q$.

If the ordinate for the curve III is indicated by $y$ we obtain;

$$q=K\cdot(tg-tv-X-y)\cdot\frac{T}{tv-t}$$

and, $$Q=T\cdot K\cdot(tg-tv-X-y)$$

By means of thermoelements 4—5, 14—15, and 8—9 a voltage and electrical current is thus obtained, which is proportional to the heat consumption. By impressing said voltage on an electrolytic meter, the heat consumption during a certain time can be measured.

It is obviously not necessary to divide the inlet pipe into branches for conducting the heat carrying medium with respectively different velocities. It is possible to obtain different velocities of the medium at spaced measuring points by constructing the inlet pipe with different cross sectional areas in different parts of the line and arranging two tubes 3, one for the junctions 4, 5 and 14, and one for the junction 15. It is not even necessary to provide two spaced apart measuring points in the inlet pipe where the medium has different velocities, but it is instead possible to introduce heat conducting bodies in the form of two tubes of unequal surface areas or with unequal effects in the inlet pipe and to place in said tubes thermoelements, which produce a combined electro-motive force corresponding to the heat consumption.

An embodiment of such a heat quantity meter is shown in Fig. 9, where 1 is the inlet pipe and 2 the outlet pipe of a heat consuming or heat emitting apparatus. The inlet pipe has a vertical portion, in which there are three measuring tubes 3, 20 and 24, and within which the heat transporting medium, for instance, water, moves upwardly in order to remove possible air bubbles formed on the measuring tubes. The measuring tubes are moreover rust-proof and smooth ground to avoid corrision and sludge formation, which might change the heat transition constant between the tubes and the medium. The measuring tubes 3, 20 and 24 are heat insulated from the inlet pipe 1 by means of bushing 7, and soldered or welded to the outlet pipe 2. The tube 24 has a smaller outer diameter within the inlet pipe than the tubes 3 and 20, which are identical. There are thermoelements in all the measuring tubes. The thermoelements in the tubes 20 and 24 have twice as many junctions as the thermoelements in the tube 3. The temperature of the medium in the inlet pipe is indicated by $tv$ and in the outlet pipe by $tk$. The temperature of the junction positioned in the measuring tube 3 on the side of the inlet pipe, is indicated by $tg$. The junctions 5, 22, and 26 placed on the side of the outlet pipe are assumed to have the temperature $tk$.

Figure 7:
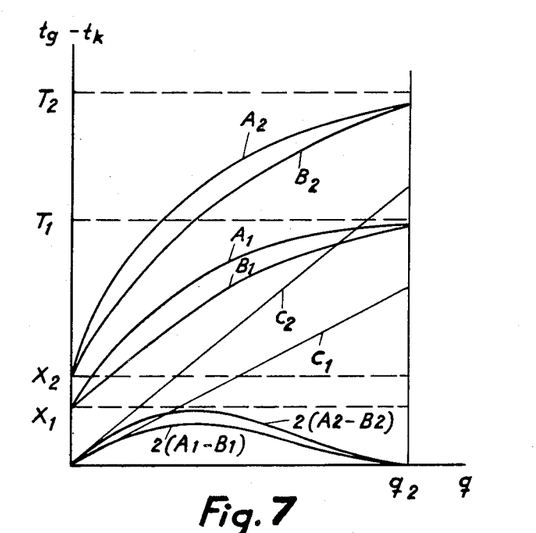

The measuring tube 3 gives an electro-motive force which is represented by the curve $A1$ or $A2$ in Fig. 7, where $q$ is the velocity of the medium. The curve $A1$ thus corresponds to the difference of temperature $tg-tk$, when $tv-tk=T1$, since $A1$ goes asymptotically to the value $T1$. The curve $A2$ corresponds to $tg-tk$ at another value of $tv-tk$, that is, $T2$. A thermoelement 8—9 gives an electro-motive force proportional to $tv-tk$, of which a part $X1$ or $X2$ is selected by means of the voltage divider 11 and is applied so that it counteracts the electromotive force from the measuring tube 3. The value $X1$ holds when $tv-tk=T1$, and $X2$ when $tv-tk=T2$. The measuring tube 20 is identical with the measuring tube 3, as stated above, but its thermoelement has twice as many junctions. Half the value of the electro-motive force obtained from the thermoelement in the measuring tube 20 will thus follow the curve $A1$, if $tv-tk=T1$, and $A2$, if $tv-tk=T2$ in Fig. 7, half of the value of the electro-motive force obtained from the thermoelement 24, on the other side, follows another curve $B1$, if $tv-tk=T1$ and $B2$, if $tv-tk=T2$. According to said curves, the difference of temperature $tg-tk$ increases with the velocity of the medium more slowly in the measuring tube 24 than in the measuring tube 20, which condition depends upon the relative diameters of the tubes, or the relative effective heat transmitting surfaces of the tubes within the inlet pipe, this being less for the tube 24 than the corresponding surface for the measuring tube 20. By changing the positions of the thermoelements in the tube 5 and by adjustment of the voltage divider 11, it is possible to make the curves $B1$ and $B2$ intersect the curves $A1$ and $A2$, respectively. The electro-motive force of the thermoelements 25—26 is $2B1$ or $2B2$ and the curves for $B1$ and $B2$ are shown in Fig. 7. If $A1$, $B1$, $A2$, and $B2$ indicate the ordinates of the curves for an arbitrary value of $q$, the quantities are in direct proportion so that, $$\frac{A1}{T1}=\frac{A2}{T2};\ \frac{B1}{T1}=\frac{B2}{T2};\ \text{and}\ \frac{X1}{T1}=\frac{X2}{T2}$$

at $q=0$ and $q=q_2$. The idea is now to take the difference $A1-B1$ and substract it from the curve $B1$ in order to obtain a straight line. By subtracting $X1$ from this line, $C1$ is obtained according to the following formula:

$$B1-(A1-B1)-X1=C1$$

This can be rewritten:

$$A1-2(A1-B1)-X1=C1$$
$$A2-2(A2-B2)-X2=C2$$

For this purpose the thermoelements 21—22 and 25—26 have twice as many junctions as the thermoelement in tube 3. Assuming that: $tv-tk=T1$, the thermoelement in tube 3 produces an electro-motive force $A1$, the thermoelement in tube 20 an electro-motive force $2A1$, the thermoelement in tube 24 an electro-motive force $2B1$, and the thermoelement 8—9 an electro-motive force $X1$.

The thermoelectro-motive forces from the measuring tubes 3, 20 and 24 and the voltage divider 11 are connected in series, the electromotive forces from the measuring tube 20 and the voltage divider 11 thereby being cumulative but counteracting the electro-motive forces from the measuring tubes 3 and 24. The resulting electro-motive force is connected to an electrolytic meter, which will register the total heat consumption during a measuring period. For each value of the velocity $q$ it therefore holds that;

$$q=K\cdot\frac{T}{T1}C1=K\cdot\frac{T}{T1}\cdot[A1-2(A1-B1)-X1]$$
$$=K\cdot\frac{T}{T2}C2=K\cdot\frac{T}{T2}\cdot[A2-2(A2-B2)-X2]$$

wherein $A1$, $A2$, $B1$, $B2$, $C1$, $C2$ indicate the ordinates of the curves and $K.T$ a constant. There is thus obtained the heat consumption:

$Q=K.T.C$, where $A=$the area of the inlet pipe 1, and whereby $C$ is the resulting electro-motive force from the thermoelements in the measuring device according to Fig. 9. The measuring device obviously has a limited measuring range, which is determined by the velocity of the medium, and which must lie between the values 0 and $q_2$ in Fig. 7.

In order to prevent the measuring tubes from being affected by external conditions as radiation and heat absorption from surrounding bodies, etc., it may be suitable to encase the measuring device in a heat insulating casing.

I claim:

1. In an apparatus measuring the product of the rate of flow of a running medium and the difference of temperature between said medium and a heat diverting device, a wall, one side of which is in contact with said medium, a heat conducting body extending through said wall, one part of said body being washed by the medium, a piece of heat insulating material surrounding and insulating said body from said wall, another part of said body on the other side of said wall being in heat conducting relation with said heat diverting device, a first thermoelement having its junctions in thermal contact with said body and in proximity to the wall and the heat diverting device, respectively, and giving an electromotive force proportional to the difference of temperature between the positions of the junctions along said heat conducting body, a second thermoelement having one junction in heat conducting contact with said medium and the other junction in heat conducting contact with said heat diverting device and giving an electromotive force proportional to the difference of temperature between the medium and said heat diverting device, said two thermoelements being connected in series and opposing each other and their electromotive forces balancing each other, when the medium is stationary, and an instrument connected to said two thermoelements for indicating the algebraic sum of the electromotive forces thereof.

2. In an apparatus for measuring the heat exchange between a running medium and a heat exchange unit through which said medium passes, an inlet pipe and an outlet pipe conducting said medium to and from said unit, respectively, a heat conducting body in the wall of one of said pipes, one part of said body being washed by the medium inside said wall, and another part of said body being in heat conducting relation with the medium in the other of said pipes, a piece of heat insulating material surrounding and insulating said body from said wall, a first thermoelement having its junctions in thermal contact with said body in proximity to the inlet and outlet pipes, respectively, and giving an electromotive force proportional to the difference of temperature between the positions of the junctions along said heat conducting body, a second thermoelement having its junctions in thermal contact with said inlet and outlet pipes, respectively, and giving an electromotive force proportional to the difference of temperature between the medium in said inlet pipe and the medium in said outlet pipe, said two thermoelements being connected in series and opposing each other and their electromotive forces balancing each other, when the medium is stationary, and an instrument connected to said two thermoelements for indicating the algebraic sum of the electromotive forces thereof.

3. In an apparatus for measuring the heat exchange between a running medium and a heat exchange unit through which said medium passes, an inlet pipe and an outlet pipe conducting said medium to and from said unit, one of said pipes having two parallel branches with one branch having a constricted section therein for giving the medium different velocities in the two different branches of the pipe, two heat conducting shunts in the wall of said one pipe, one in each of said two branches, each of said shunts consisting of a heat conducting body one part of which is contacted by the medium inside said wall and conducting heat between the medium in said pipe and the other one of said pipes, a piece of heat insulating material for each of said shunts surrounding and isolating the shunt from said wall, a first thermoelement having its junctions in thermal contact with one of said shunts and in proximity to the inlet and outlet pipes, respectively, and giving an electromotive force proportional to the difference of temperature between the positions of the junctions in said shunt, a second thermoelement having one junction in thermal contact with each of said shunts and in proximity to the inlet pipe and giving an electromotive force proportional to the difference of temperature between the positions of the junctions in the respective shunts, a third thermoelement having one junction in thermal contact with each of said inlet and outlet pipes and giving an electromotive force proportional to the difference of temperature between the medium in said inlet pipe and the medium in said outlet pipe, said three thermoelements being connected in series, said second and said third thermoelements counteracting said first thermoelement and the three electromotive forces nullifying each other when the medium is stationary, and an instrument connected to the three thermoelements for measuring the resulting electromotive force to show said heat exchange.

4. In an apparatus for measuring the heat exchange between a running medium and a heat exchanging unit passed by said medium, an inlet pipe and an outlet pipe conducting said medium to and from said unit, three heat conducting shunts in the wall of one of said pipes, each of said shunts consisting of a heat conducting body, one part of which is contacted by the medium inside said wall and conducting heat between the medium in said pipe and the other one of said pipes, pieces of heat insulating material for each of said shunts surrounding and insulating the shunt from said wall, a thermoelement for each of said bodies having its junctions in thermal contact with the body and in proximity to the inlet and outlet pipes, respectively, and giving an electromotive force proportional to the difference of temperature between the positions of the junctions along the body, one of said bodies having less effective heat transmitting surface in contact with the medium than the others, the thermoelement for one of the other two bodies giving half the electromotive force of the thermoelement of the other one, a fourth thermoelement having one junction in thermal contact with each of said inlet and outlet pipes and giving an electromotive force proportional to the difference of temperature between the medium in said feed pipe and the medium in said outlet pipe, all of said thermoelements being connected in series, said thermoelement giving half the electromotive force and the thermoelement in said body with less effective heat transmitting surface being counteracted by the other two and the four electromotive forces nullifying each other when the medium is stationary, and an instrument connected to the four thermoelements for measuring the resulting electromotive force to show said heat exchange.

5. In an apparatus for measuring the heat consumption of a heat interchange device having an inlet pipe for conducting a heating medium thereto and an outlet pipe for conducting the exhaust medium therefrom, a heat conducting hollow body extending through the inlet pipe, heat insulating bushings mounted in the wall of said inlet pipe and surrounding said body, said body being in heat interchange relationship with said outlet pipe, and a thermo-couple having one junction within said body and within the inlet pipe and the other junction within said body and adjacent the outlet pipe.

6. In an apparatus for measuring the heat consumption of a heat interchange device having an inlet pipe for conducting a heating medium thereto and an outlet pipe for conducting the exhaust medium therefrom, a heat conducting hollow body extending through the inlet pipe and in heat interchange relationship with the outlet pipe, heat insulating bushings mounted in the wall of said inlet pipe and surrounding said body, and a thermo-couple having one junction within said body and within the inlet pipe and the other junction within said body and adjacent the outlet pipe, and a reference thermo-couple having its junctions respectively on the walls of the inlet and outlet pipes and differentially connected in series with the first thermo-couple.

7. In an apparatus for measuring the heat consumption of a heat interchange device having an inlet pipe for conducting a heating medium thereto and an outlet pipe for conducting the exhaust medium therefrom, a heat conducting hollow body extending through the inlet pipe and in heat interchange relationship with the outlet pipe, heat insulating bushings mounted in the wall of the inlet pipe and surrounding said body, and a thermo-couple comprised by a first disc of electrical insulating material mounted in said body adjacent the outlet pipe, a second disc of electrical insulating material mounted in said body within the inlet pipe, said thermo-couple being comprised by pairs of elements of opposite thermo-sensitivity, the alternate junctures between the pairs being mounted respectively on the insulating discs.

8. In an apparatus for measuring the product of the rate of flow of a running medium and the change of temperature of said medium passing through a heat exchange unit having an inlet pipe and an outlet pipe, said inlet pipe having two different parts in which the velocity is different, a heat conducting body positioned in the walls of the inlet pipe and extending through both of said parts, one part of said body inside said walls being contacted by the medium, pieces of heat insulating material insulating said body from the walls of the inlet pipe, another part of said body outside of said inlet pipe being in thermal contact with the medium in said outlet pipe, a first thermoelement having its junctions in thermal contact with the body in the different parts of the inlet pipe for giving an electromotive force proportional to the difference of temperature between the respective parts of the body in the different parts of the inlet pipe, a second thermoelement having one junction in thermal contact with one part of the body within one part of the inlet pipe and the other junction in thermal contact with another part of the body adjacent the outlet pipe for giving an electromotive force proportional to the difference of temperature between said parts of the body in said inlet pipe and in said outlet pipe, respectively, and a third thermoelement having its junctions in thermal contact with the inlet pipe and the outlet pipe, respectively, for giving an electromotive force proportional to the difference of temperature between the medium in the inlet and that in the outlet pipe, said three thermoelements being connected in series, the first and last mentioned thermoelements counteracting the second mentioned thermoelement and the three electromotive forces balancing each other when the medium is stationary, and an instrument connected to the three thermoelements for indicating the algebraic sum of the electro-motive forces thereof.

9. In an apparatus for measuring the product of the rate of flow of a running medium and the change of temperature of said medium passing through a heat exchange unit having an inlet pipe and an outlet pipe, two heat conducting bodies mutually alike and a third heat conducting body with less effective heat transmitting surface than said first two bodies positioned in the wall of said inlet pipe, one part of each of said bodies inside the inlet pipe being contacted by the medium, a piece of heat insulating material insulating each of said bodies from the wall of the inlet pipe, another part of each of said bodies outside said inlet pipe being in thermal contact with said outlet pipe, a thermoelement in each of said bodies having one junction in thermal contact with the part of each body within said inlet pipe and the other junction in thermal contact with the other part of each body in thermal contact with the outlet pipe and giving an electro-motive force proportional to the difference in temperature between the positions of the junctions in said heat conducting bodies, the thermoelement in one of said two mutually alike bodies having half as many junctions as the other two thermoelements, an additional thermoelement having its junctions in thermal contact with the inlet and outlet pipes, respectively, and giving an electro-motive force proportional to the difference in temperature between the medium in the inlet pipe and that in the outlet pipe, all of said thermoelements being connected in series, said thermoelement with half as many junctions and the thermoelement in said heat conducting body with less effective heat transmitting surface being counteracted by the other two thermoelements and the four electromotive forces balancing each other when the medium is stationary, and an instrument connected to said four thermoelements for indicating the algebraic sum of the electro-motive forces thereof.

10. In an apparatus for measuring the heat exchange between a running medium and a heat exchange unit through which said medium passes, an inlet pipe and an outlet pipe conducting said medium to and from said heat exchange unit, respectively, said inlet pipe being divided into two parallel branches with one of said branches having a constricted section therein for imparting to said medium a lesser velocity through the branch having the constricted section therein, two heat conducting shunts extending through the walls of the inlet and outlet pipes, one terminating in the unconstricted branch and the other in the branch having the constricted section of the inlet pipe, each of said heat conducting shunts consisting of a heat conducting body with parts contacted by the medium inside said walls, heat insulating means surrounding said shunts at the points where same pass through the walls of the inlet pipe, said shunts conducting heat between the medium in said inlet pipe and the medium in said outlet pipe, a first thermoelement having one junction in thermal contact with the end of the heat conducting shunt within the branch having the constricted section of the inlet pipe and the other junction in thermal contact with the end of the heat conducting shunt within the unconstricted section of the inlet pipe for giving an electro-motive force proportional to the difference of temperature between the positions of the junctions along said shunts, a second thermoelement having its junctions in one of the respective heat conducting shunts with one junction within the inlet pipe and the other junction within the outlet pipe for giving an electro-motive force proportional to the difference of temperature between the positions of the junctions along the shunt, and a third thermoelement having its junctions in thermal contact with the inlet and outlet pipes, respectively, for giving an electro-motive force proportional to the difference in temperature between the medium in the inlet pipe and the medium in the outlet pipe, said three thermoelements being connected in series with said first and third thermoelements counteracting said second thermoelement and the three electro-motive forces nullifying each other when the medium is stationary, and an instrument connected to said three thermoelements for measuring the resultant electro-motive force to indicate said heat exchange.

NILS GOTTFRID LINDSTRÖM.

REFERENCES CITED

The following references are of record in the file of this patent:

UNITED STATES PATENTS

| Number | Name | Date |
|---|---|---|
| 1,640,801 | Peterson | Aug. 30, 1927 |
| 1,903,717 | Lange | Apr. 11, 1933 |
| 1,996,943 | Wile | Apr. 9, 1935 |
| 2,446,283 | Hulsberg | Aug. 3, 1948 |

FOREIGN PATENTS

| Number | Country | Date |
|---|---|---|
| 400,617 | Germany | Aug. 18, 1924 |
| 799,747 | France | Apr. 11, 1936 |
| 806,033 | France | Sept. 14, 1936 |